United States Patent [19]

Howell, Jr.

[11] 3,998,306
[45] Dec. 21, 1976

[54] RAIL CONSTRUCTION FOR RAIL-TYPE ELECTRIFICATION SYSTEMS

[76] Inventor: Alleyne C. Howell, Jr., c/o Howell Corporation, 1180 Stratford Road, Stratford, Conn. 06497

[22] Filed: Aug. 8, 1975

[21] Appl. No.: 603,149

[52] U.S. Cl. ............................... 191/23 R; 29/509; 174/99 B; 174/133 B
[51] Int. Cl.² ......................................... B60M 1/34
[58] Field of Search ............ 174/94 R, 68 R, 99 B, 174/133 B; 191/22 R, 22 DM, 23 R, 23 A, 29 R, 290 M, 30, 31, 33 R, 33 DM, 40; 339/22 R, 22 B; 29/509, 515, 624

[56] References Cited

UNITED STATES PATENTS

| | | | |
|---|---|---|---|
| 1,746,201 | 2/1930 | Tashjian | 29/509 X |
| 2,640,114 | 5/1953 | Wehr | 191/23 A |
| 2,820,084 | 1/1958 | Shaw | 191/22 DM X |
| 2,882,376 | 4/1959 | Charbonneau | 29/515 |
| 3,590,173 | 6/1971 | Stahmer | 191/23 A X |
| 3,892,299 | 7/1975 | Kilburg | 191/22 R X |

FOREIGN PATENTS OR APPLICATIONS 215,542   10/1941   Switzerland ................ 191/33 DM Primary Examiner—Stephen G. Kunin
Attorney, Agent, or Firm—H. Gibner Lehmann; K. Gibner Lehmann

[57] ABSTRACT

A rail construction for rail-type electrification systems, comprising a conducting rail member having a cross-sectional configuration somewhat like a pair of channel shapes disposed back to back. One channel shape is used for suspension or mounting, as well as rigidity. The other channel shape contains a stainless steel insert in the form of a flat contact member which is secured in place by being pinched between opposed wall areas of flanges of the rail member, in consequence of the flanges being swaged or displaced beyond their elastic limit to effect a gripping of the contact member. The inner walls of the flanges, which adjoin the elongate contact member, constitute metal guideways that assure a positive tracking of the collector shoe. Any small relative movements between the conducting rail member and the stainless steel insert, as occasioned by temperature changes for example, cannot result in loosening of the insert or deterioration of the electrical conductance thereto. The rail member can be provided with a skin-tight jacket of insulation that is coextensive with the member and capable of accommodating mounting clamps at any desired locations.

4 Claims, 9 Drawing Figures

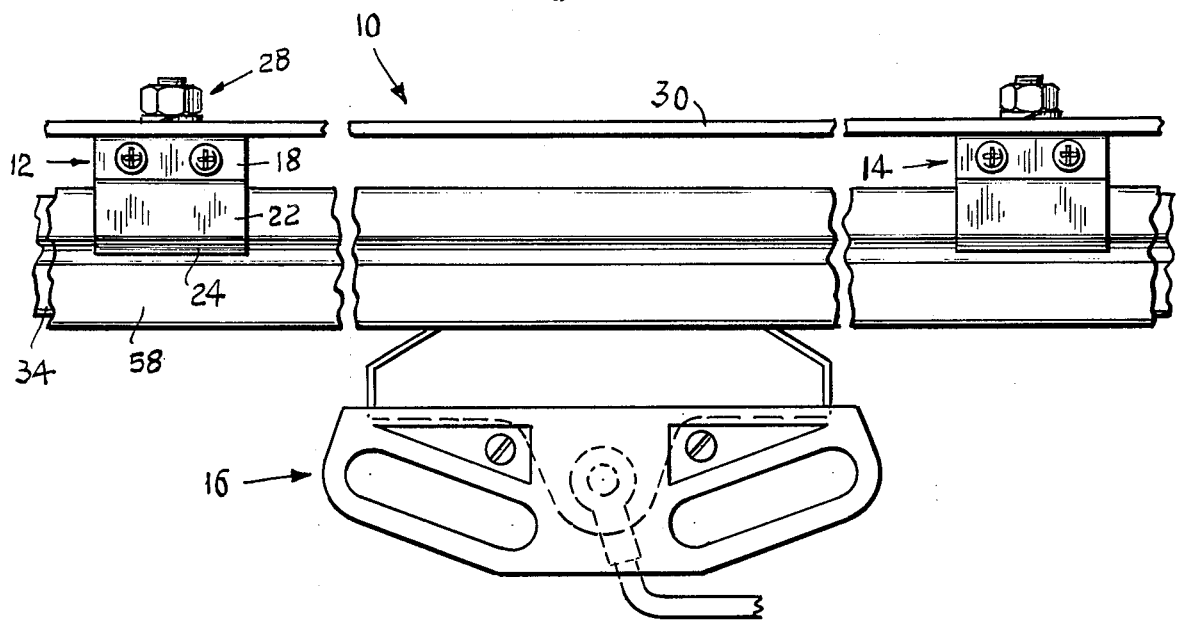
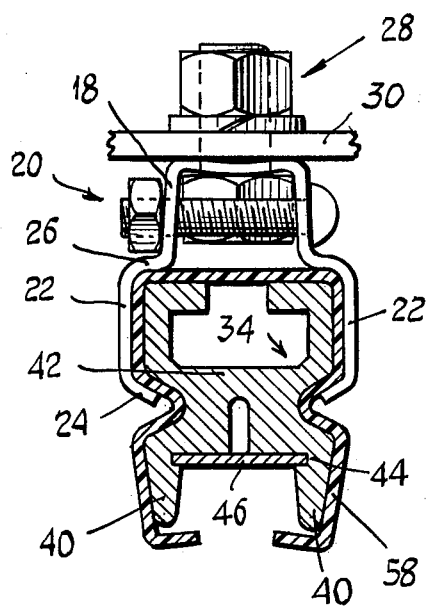
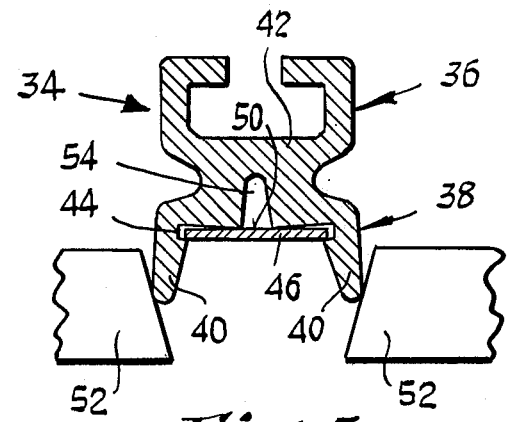
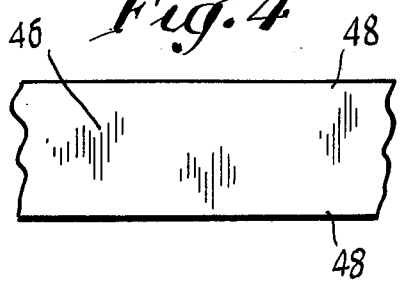
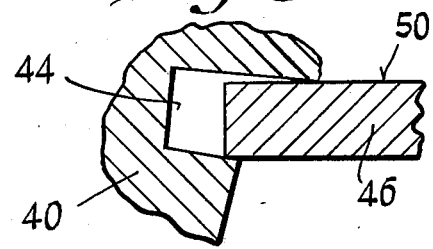

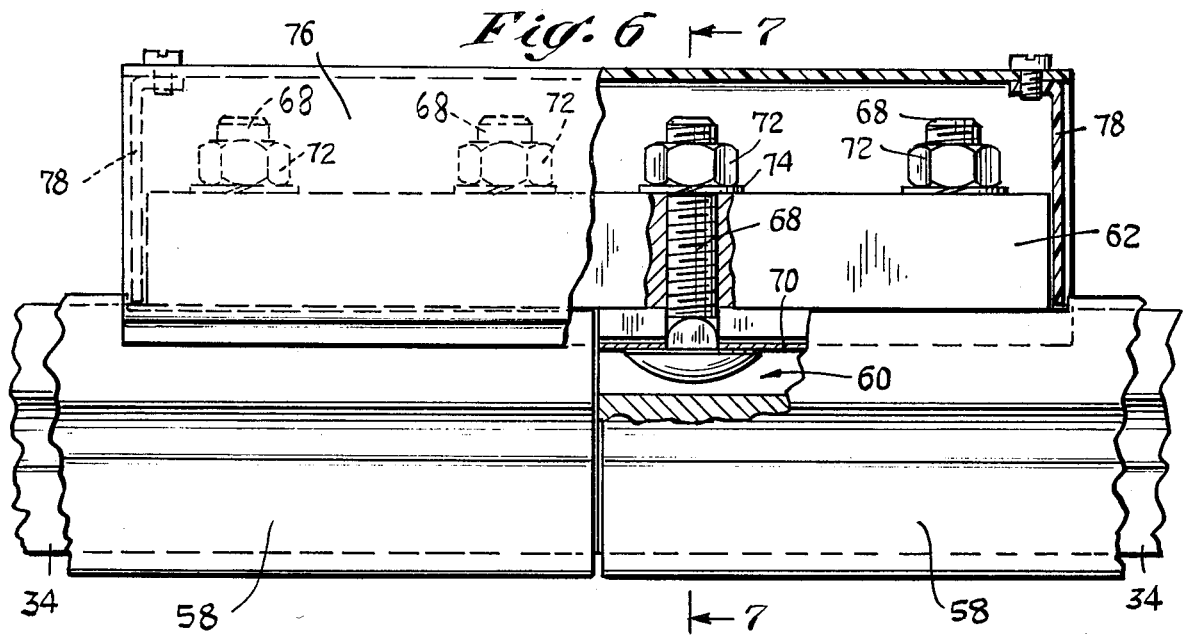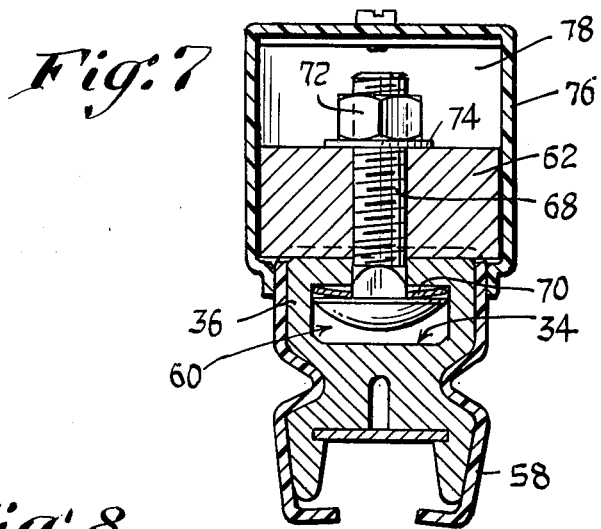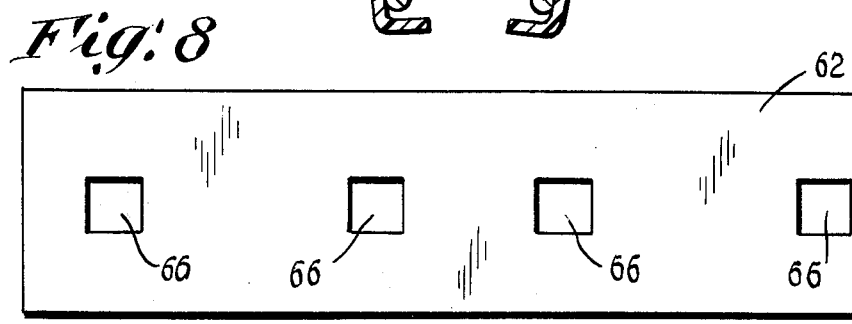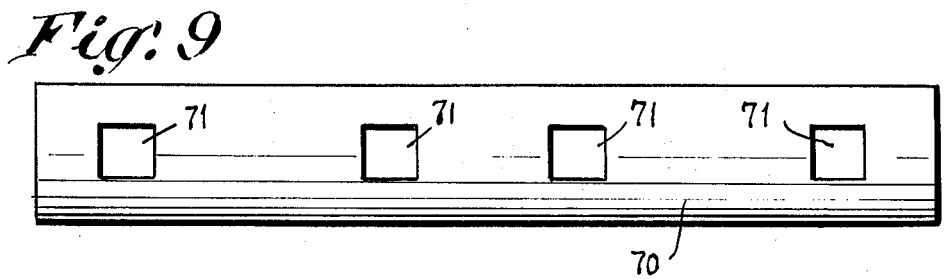

RAIL CONSTRUCTION FOR RAIL-TYPE ELECTRIFICATION SYSTEMS

BACKGROUND OF THE INVENTION

This invention relates to rail-type electrification systems as used for vehicles, cranes and the like, and more particularly to the rail constructions of such systems.

In the past a number of conducting rail and shoe constructions have been proposed, for rail-type electrification systems. Many of the rail constructions comprised electrically conducting rail members of rigid cross-section and characteristics, to which contact members have been affixed for engagement by the collector shoe. In one prior construction the conducting rail member had a deep V-shaped groove in its tracking portion, and a formed contact member of somewhat channel shape was fitted over the tracking portion, with the flanges of the contact member staked to the side walls of the conducting rail member. This arrangement was not especially satisfactory, since there was a tendency for the contact member to loosen and move with respect to the rail member under conditions of use, as when stressed or subjected to appreciable temperature changes.

Another prior construction was somewhat similar to the above described arrangement except that the contact member was perforated, and a welding procedure was utilized at the perforations, to secure the two members together. While this eliminated the looseness and relative movement of the members, it was an expensive procedure which increased the cost of the rail construction appreciably.

Yet another prior rail construction involved a rail member having a cross-section somewhat like an I-beam, where the contact member had a box-like cross section, with its edge portions folded against the flanges or webs of the rail member. This arrangement also had the disadvantage that the contact member would swell and loosen, either as a consequence of stress or else temperature changes.

The above disadvantages of the prior inventors were obviated by the composite rail construction described and claimed in my copending application, U.S. Ser. No. 403,939, filed Oct. 5, 1973 entitled Electric Feeder Rail Construction, now U.S. Pat. No. 3,902,579. While the above rail construction proved to be satisfactory with regard to the aspects set forth above, it did not have metal guideways that would assure positive tracking of the collector shoe.

SUMMARY OF THE INVENTION

The drawbacks of prior rail constructions for rail-type electrification systems, as set forth above, are obviated by the present invention, which has for its main object the provision of an improved rail structure wherein substantial metal guideways assure a positive tracking of the collector shoe, and wherein a flat contact member or insert which is coextensive with the rail member is securely crimped or clamped to as to eliminate looseness and deterioration of conductivity, all in an inexpensive manner which does not undesirably increase the cost of the product.

A feature of the invention resides in the provision of an improved rail construction in accordance with the foregoing, wherein components of simple shape and economical fabrication are utilized, being quickly assembled with a minimum of equipment and expense.

Another feature of the invention resides in the provision of an improved rail construction as above set forth, wherein a simple and effective jacket-type insulation can be utilized throughout the length of the rail construction, at a minimum of cost while still permitting the use of simple mounting clamps at any desired locations.

The above objects are accomplished by a novel and improved rail construction for rail-type electrification systems, comprising an elongate electrically conducting rail member having a pair of spaced flange portions and a web portion connecting the flange portions, the latter having undercuts in their inner surfaces adjacent the web portion. The device further includes an elongate, flat contact member having oppositely disposed edge portions extending into the undercuts and being permanently pinched by the walls thereof. The pinching results from the flange portions being inwardly forced beyond the elastic limit of the stock toward one another from divergent positions, with the edges of the contact member being positioned in the undercuts. One broad surface of the contact member faces the web portion so as to be in electrical and mechanical contact therewith. The web portion has a cross sectional configuration enabling it to be permanently re-shaped when the flange portions are forced inwardly, with the web and flange portions being under continual tensile stress when effecting the pinching of the contact member.

The rail member is preferably constituted of aluminum for obtaining high conductivity, with the contact member being constituted of stainless steel which resists electrical pitting. The arrangement is such that, since the aluminum rail member will expand in cross section by a greater amount than the steel insert as rises in temperature are experienced, there can be no permanent distortion of the rail member as it expands, which would be the case were the aluminum confined by the steel. Thus, looseness between the parts with temperature variation is virtually eliminated.

Other features and advantages will hereinafter appear.

In the accompanying drawings:

FIG. 1 is a fragmentary side elevational view of a rail construction and installation as provided by the invention, shown in conjunction with a known type of collector shoe.

FIG. 2 is a transverse sectional view of the rail construction, supported by a mounting clamp, which latter is shown in elevation.

FIG. 3 is a sectional view of the rail construction, illustrating a step in the assembly of the conducting rail and contact strip.

FIG. 4 is a fragmentary plan view of the contact member component of the rail construction, and FIG. 5 is a fragmentary transverse sectional view, greatly enlarged, of a pinching or crimping undercut portion of the conductor rail.

FIG. 6 is a fragmentary side elevational view of a rail construction similar to that of FIGS. 1–5, and including a novel rail joint between two adjacent rail members, this construction constituting another embodiment of the invention.

FIG. 7 is a section taken on line 7—7 of FIG. 6.

FIG. 8 is a top plan view of the connection strip employed in the rail joint of FIG. 6.

FIG. 9 is a top plan view of a resilient, bowed washer or strip employed in the construction of FIGS. 6 and 7.

Referring first to FIG. 1 there is illustrated a section of the rail construction, designated generally by the numeral 10, which is carried by a pair of mounting clamps 12, 14 and engaged by a collector shoe assemblage 16.

Details of the collector shoe assemblage 16 are not given here since they form no part of the present invention. Such assemblages are described and claimed in my U.S. Pat. No. 3,525,823 dated, Aug. 25, 1970, and entitled Electrical Collector For Conductor Rails.

The mounting clamps 12, 14 are formed of sheet metal, being generally of channel shape in cross-section. Each clamp comprises a U-shaped body portion 18 which is apertured to receive clamping bolts 20 by which the U-shape can be forced or squeezed together to reduce its width. Clamping jaws 22 depend from the body portion 18 and have inturned lower edges 24 and upper joining portions 26 which provide a shallow channel configuration to the jaws.

The body portion 18 has a centrally located aperture in its top to accommodate a mounting bolt 28 which passes through the supporting structure 30 to which the rail construction is to be secured.

In accordance with the present invention the rail construction 10 comprises a unique and improved conductive structure by which current is reliably provided for the collector shoe 16, together with metal guideways that assure positive tracking of the shoe in an arrangement which can be very economically produced and is characterized by a long and useful service life.

Referring to FIGS. 2 and 3, the improved rail construction comprises an elongate, malleable electrically conducting rail member 34 formed of extruded metal stock such as aluminum, having a cross-sectional configuration somewhat like a pair of channels 36, 38 secured back to back. The rail member 34 includes a pair of spaced flange portions 40 and a web portion 42 bridging and connecting said flange portions as shown.

The flange portions 40 have longitudinal grooves or undercuts 44 at their bases, in which there is carried and pinched an elongate, flat contact member 46 which is coextensive with the rail member 34. As shown, the oppositely disposed parallel edge portions 48 of the contact member 46 are received in the grooves or undercuts 44 of the rail member 34. One broad surface 50 of the contact member 46 faces and is juxtaposed to the web portion 42 of the rail member, and preferably is forcibly engaged therewith.

The web portion 42 of the rail member has a cross-section which enables it to be readily swaged or permanently distorted when the flange portions 40 are forced inwardly or toward each other, as by means of tools or rollers 52 illustrated in FIG. 3. Such cross-section can be effected, for example, by the provision of a relatively deep longitudinal groove 54 in the web portion 42. Also, the metal of the member 34 can be made to cold flow under the action of the tools 52.

As provided by the present invention, the conducting rail member 34 is initially extruded to have a configuration similar to that illustrated in FIG. 3, wherein the flanges of the channel shapes 36, 38 are somewhat divergent, with the flange portions 40 being spaced apart the greater distance. The undercuts 44 are also somewhat divergent or opened, and with this arrangement the contact rail member 46 can be easily slid into the undercuts 44 as seen in FIGS. 3 and 5. After such assembly of the contact member 46, the rail member 34 is swaged or permanently reformed by the application of force to the flange portions 40 so as to permanently shift these inward or toward each other, from the position of FIG. 3 to the position of FIG. 2. This swaging or stressing of the rail member 34 past its elastic limit closes the undercuts 44 and groove 54 to such an extent that the contact member 46 is securely permanently pinched or crimped in the lower channel shape 38. The swaging results in the member 34 remaining under a continual cross-sectional tensile stress, as it securely grips the contact strip 46. Also, the swaging or qualifying of the rail member 34 as above described, after its assembly to the contact member 46, can be very easily and quickly effected by an economical process. Moreover, the contact member 46 has the simplest possible shape, that of a flat strip. And, the cross-sectional configuration of the rail member 34 can be readily produced by an extrusion die.

I have found that a rail construction as thus made is not likely to deteriorate, as by looseness of the components or loss of conductivity during service. The flange portions 40 provide for positive tracking of the collector shoe 16, and the flat surface of the contact member 46 provides for long conductor wear. By making the member 46 of stainless steel there is had resistance to corrosion and electrical pitting. Since the contact member 46 is of steel and the channel 38 is of aluminum, the latter will expand more as rises in temperature are experienced. Therefore, any increase in the width of the steel strip 46 will not cause a spreading of the channel flange portions 40. Accordingly, there is no permanent deformation of the channel when the temperature rises, or resultant looseness of the parts when the temperature again drops. I have found that to be an important feature, in minimizing looseness between the channel 38 and member 46 over wide ranges of temperature.

The improved rail construction as above set forth can be encased in a skin-tight insulating jacket 58, which can be of PVC plastic, or silicone rubber. Such insulation enables the mounting clamps 12 to be placed at any desired locations along the rail construction.

The invention further provides, in FIGS. 6–9, a unique connector assemblage, in conjuction with an additional rail member 34 which is identical in construction to the member 34 of FIGS. 1–5, the two members 34 being disposed end to end. As shown in FIG. 7, each member 34 has a T-slot 60 formed by the walls of the channel 36. Disposed over the mouth of the channel is an elongate connection strip 62 which overlaps the ends of the members 34 as shown. The connection strip is particularly illustrated in FIG. 8 and includes multiple apertures 66 to respectively receive a series of steel carriage bolts 68. The latter include nuts 72 which secure the connection strip 62 to the ends of the members 34 as shown. In accomplishing this, the heads of the bolts are disposed in the T-slot 60, and a resilient washer means in the form of a bowed strip 70 (FIG. 9) is interposed between the heads of the bolts and the inner surfaces of the channel 36. The arrangement is such that when the nuts 72 are tightened, pressure will be exerted on the connection strip 62 urging it into firm engagement with the upper surface of the channel 36 in FIG. 7. In addition, the width of the bowed strip 70 is such that it substantially fills the T-slot 60. When the bolts are tightened, the bowed strip 70 becomes sightly wider and thus effects a precise alignment of the rail members 34; I have found this self-alignment feature to be an important advantage of the above construction.

The bowed strip 70 includes square apertures 71 which prevent turning of the carriage bolts while the nuts 72 are being secured, as can be seen in FIG. 7. In addition, spring lock washers 74 are carried under each of the nuts 72. Optionally, the connection strip 62 can be constituted of two back-to-back coextensive members, each member having a thickness equal to half that of the strip 62 shown in FIG. 7. Under such circumstances, both of the members could be employed for high current carrying capacity; or one member could be omitted for reduced capacity, in order to save on the material required for the strip. One thick connection strip 62 is shown in FIG. 7 in the interest of clarity.

The above construction is seen to have a number of advantages. The joint is effective both mechanically and electrically, due to the relatively large surface areas of the channel 36 and connection strip 62 which are in contact. In addition, with increases in temperature, the aluminum member 36 and connection strip 62 tend to expand more than the steel bolts 68. This strain, caused by the unequal expansion, is taken up by the bowed washer or strip 70. Without some form of strain relief, I have found that the bolt head (or nut) tends to deform the aluminum when the assemblage is subjected to heat; upon cooling, the joint becomes loose, due to the unequal contraction, and a poor mechanical and electrical connection results. The provision of a yieldable take-up between each bolt on the one hand, and the rail member and connection strip on the other hand, has been found to provide satisfactory results over wide ranges of temperature.

The plastic covering 58 over the rail members 34 can be cut away in the vicinity of the rail joint. An additional plastic covering or hood 76 is then snapped over the joint, including end flaps 78 bolted in place as shown in FIG. 6 to prevent inadvertent contact by personnel, grounded objects, power cables, other equipment and the like.

It will now be seen from the foregoing that I have provided an improved rail construction for electrification systems, the device being especially economical to produce and providing improved performance with regard to tightness and conductivity of the components as well as positive tracking of the collector shoe. Also, the compact mounting provided by the clamps 12, 14 enables the rail construction to be mounted in vertical or horizontal positions, without special parts or fittings. The rail joint provided by the bowed strip 70 is seen to be self-aligning, thus minimizing problems with discontinuities at the joint. The rail construction is thus seen to constitute a distinct advance and improvement in the technology of rail electrification systems.

Variations and modifications are possible without departing from the spirit of the invention.

I claim:

1. A rail construction for rail-type electrification systems, comprising in combination:
   a. a pair of rail members having abutting end portions provided with T-slots,
   b. a connection strip bridging said abutting end portions,
   c. bolts passing into the T-slots of said end portions and through the connection strip, for securing the rail members to each other in end-to-end relation,
   d. the heads of said bolts being disposed in said T-slots, and
   e. resilient, bowed washer means located in the T-slots under the bolt heads, said washer means being secured to enable it to bow more or less due to unequal expansion and contraction of the bolts as compared with the rail members and connection strip.

2. The rail construction as defined in claim 1, wherein:
   a. the bowed washer means comprises an elongate resilient strip having a plurality of apertures through which the bolts extend.

3. The rail construction as defined in claim 2, wherein:
   a. the elongate resilient strip has a width sufficiently great to substantially fill the T-slot, such that when the elongate resilient strip is flatened by tightening the bolts, there is effected a precise alignment of the rail members.

4. The rail construction as defined in claim 3, wherein:
   a. the concave surface of the resilient strip faces the opening of the T-slot of one of the rail members,
   b. said bolts having spring lock washers disposed against the connection strip,
   c. said lock washers being under continual tension and tending to flatten the elongate resilient strip.

* * * * *